UNITED STATES PATENT OFFICE.

BYRON M. PICKETT, OF NEW YORK, N. Y., ASSIGNOR TO THE NEW PROCESS STEEL HARDENING COMPANY, OF PORTLAND, MAINE.

PROCESS OF HARDENING STEEL.

SPECIFICATION forming part of Letters Patent No. 437,793, dated October 7, 1890.

Application filed March 3, 1890. Serial No. 342,441. (No specimens.)

*To all whom it may concern:*

Be it known that I, BYRON M. PICKETT, of the city and State of New York, have invented a certain Improvement in Treating Steel, of which the following is a specification.

This invention relates to treating steel by plunging it while red-hot into a bath composed either of oil or water as the diluent and a base containing a calcined metallic ingredient or ingredients—such as an oxide or carbonate—or both an oxide and carbonate, of iron or other metal of the so-called "iron group"—such as manganese, cobalt, or nickel—and also a combustible organic substance which is soluble in water, such as glucose.

Two pending applications for patents, filed March 3, 1890, and serially numbered 342,442 and 342,443, describe a class of tempering-fluids composed of mixtures of the ingredients hereinabove set forth prepared under various conditions of heat.

The object of the present invention is to obtain the greatly-enhanced useful effect which results from the treatment of the steel in a bath of the class referred to, the metallic ingredient or ingredients of which have been thoroughly calcined preparatory to their employment for the present purpose. The required calcination is effected by heating the carbonate or oxide of iron, or other metal of the iron group which is to be employed, in an iron or other suitable vessel, which is kept at a red heat until the metallic oxide or carbonate contained in it is thoroughly calcined.

The diluent, either oil or water, as may be preferred, is employed in the proportions of about one gallon to each half-ounce, by weight, of the calcined metallic ingredient present.

The presence of a small portion of the calcined metallic ingredient in the bath produces a sensible effect upon the steel treated in it, and this effect appears to be increased as the quantity of the calcined metallic ingredient is increased until the above-described proportion is reached, beyond which point the addition of more of the calcined metallic ingredient does not appear to be important.

When, as in the present case, the base is to include a combustible organic substance—such as glucose, or its equivalent—the ingredients can be mixed together either while the calcined oxide or carbonate is so hot as to cause ignition of the glucose, or at a lower temperature. It is generally preferred to cool the metallic ingredient after calcination to a temperature just below that at which the glucose will ignite, and then to thoroughly mix the two substances together.

A variety of combustible organic substances which are soluble in water—such as dextrine, glycerine, molasses, honey, starch, &c.—may be used as substitutes for glucose.

In practice the steel to be hardened is usually heated until it presents a dull-red appearance in a moderately dark place and is then at once plunged into the tempering-fluid. After hardening, the temper may be drawn in the usual manner, and it will be found that steel thus treated will possess not only hardness, but a remarkable degree of tensile strength.

What is claimed as the invention is—

The process of treating steel by heating it to a red heat and then plunging it into a bath composed of a diluent and a base containing a calcined oxide or carbonate, or both an oxide and a carbonate of a metal of the so-called "iron group," together with a combustible organic substance which is soluble in water, such as glucose, substantially as set forth.

BYRON M. PICKETT.

Witnesses:
EDMUND TWEEDY,
WM. E. QUIMBY.